US011794190B2

(12) United States Patent
Hughes

(10) Patent No.: US 11,794,190 B2
(45) Date of Patent: Oct. 24, 2023

(54) APPARATUS AND METHOD FOR PROVIDING VISUAL SIGNALS RELATING TO A PLURALITY OF LABORATORY SAMPLE CARRIERS

(71) Applicant: PYRAMID INNOVATION LTD, Polegate (GB)

(72) Inventor: Thomas Fergus Hughes, Netherfield (GB)

(73) Assignee: Pyramid Innovation Ltd, Polegate (GB)

( * ) Notice: Subject to any disclaimer, the term of this patent is extended or adjusted under 35 U.S.C. 154(b) by 361 days.

(21) Appl. No.: 17/261,988

(22) PCT Filed: Aug. 6, 2019

(86) PCT No.: PCT/GB2019/052197
§ 371 (c)(1),
(2) Date: Jan. 21, 2021

(87) PCT Pub. No.: WO2020/030898
PCT Pub. Date: Feb. 13, 2020

(65) Prior Publication Data
US 2021/0260592 A1    Aug. 26, 2021

(30) Foreign Application Priority Data
Aug. 7, 2018  (GB) ...................................... 1812825

(51) Int. Cl.
*G01N 35/00*    (2006.01)
*G01N 37/00*    (2006.01)
*B01L 9/00*     (2006.01)

(52) U.S. Cl.
CPC ......... *B01L 9/523* (2013.01); *B01L 2200/143* (2013.01); *B01L 2300/021* (2013.01); *B01L 2300/027* (2013.01); *B01L 2300/0627* (2013.01)

(58) Field of Classification Search
None
See application file for complete search history.

(56) References Cited

U.S. PATENT DOCUMENTS

| 3,753,657 A * | 8/1973 | Downing ............... G01N 35/10 |
| | | 422/65 |
| 2014/0241959 A1* | 8/2014 | Birolini .................... B01L 9/06 |
| | | 422/562 |

(Continued)

FOREIGN PATENT DOCUMENTS

| DE | 145 130 A1 | 11/1980 |
| EP | 2 751 746 B1 | 11/2015 |

(Continued)

OTHER PUBLICATIONS

PCT/GB2019/052197 International Search Report and Written Opinion, dated Oct. 15, 2019.
GB1812825.6 Search Report dated Mar. 11, 2019.

*Primary Examiner* — Paul S Hyun
(74) *Attorney, Agent, or Firm* — LIPPES MATHIAS LLP

(57) ABSTRACT

There is an apparatus (1) and a method for providing visual signals relating to a plurality of laboratory sample carriers (2). Laboratory sample carriers (2) are placed on corresponding carrier bays (6) of a tray (4) wherein each sample carrier (2) displays an identification code (5). A digital image of at least part of the tray (4) is taken with a digital camera (11). The digital image is processed with a processing device (13) to read the laboratory sample carrier identification codes (5) in the image. A visual signal emitting device (10) is activated to emit at least one visual signal for each (Continued)

occupied carrier bay (6) included in the image wherein the visual signal emitted for each carrier bay (6) is determined by the sample carrier identification code (5) read by the processing device (13) from a corresponding carrier bay part of the processed image.

7 Claims, 7 Drawing Sheets

(56) References Cited

U.S. PATENT DOCUMENTS

| | | |
|---|---|---|
| 2016/0025757 A1 | 1/2016 | Pollack et al. |
| 2016/0083773 A1 | 3/2016 | Triva |

FOREIGN PATENT DOCUMENTS

| | | |
|---|---|---|
| EP | 2 705 372 B1 | 9/2016 |
| WO | WO 2010/004332 A1 | 1/2010 |
| WO | WO 2013/050849 A1 | 4/2013 |

\* cited by examiner

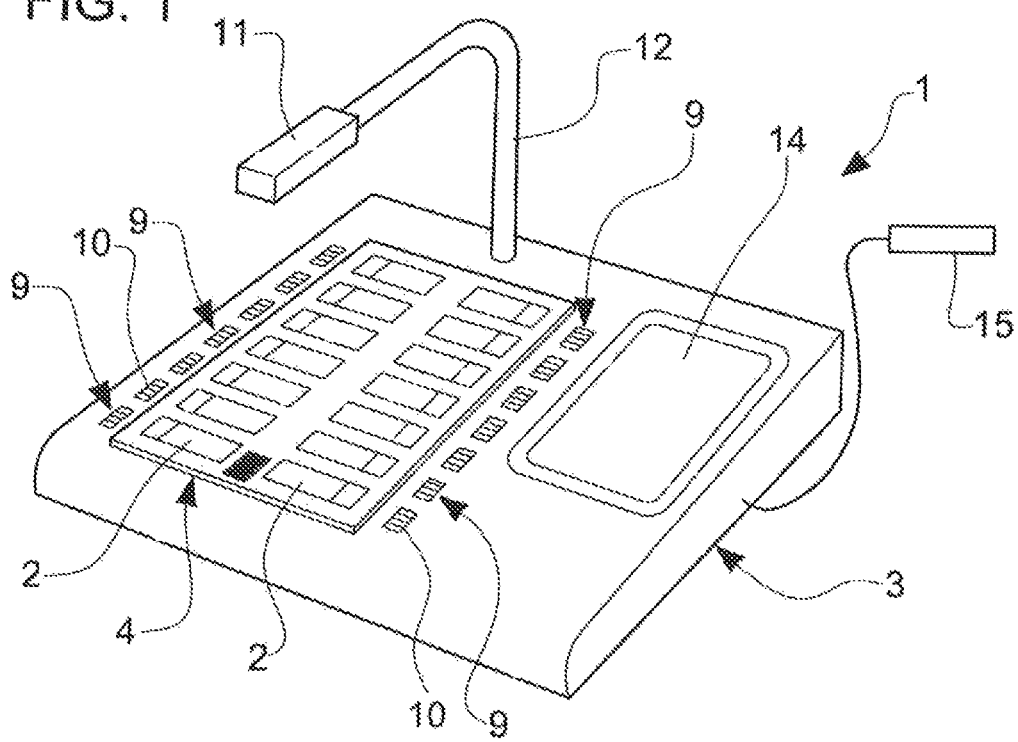
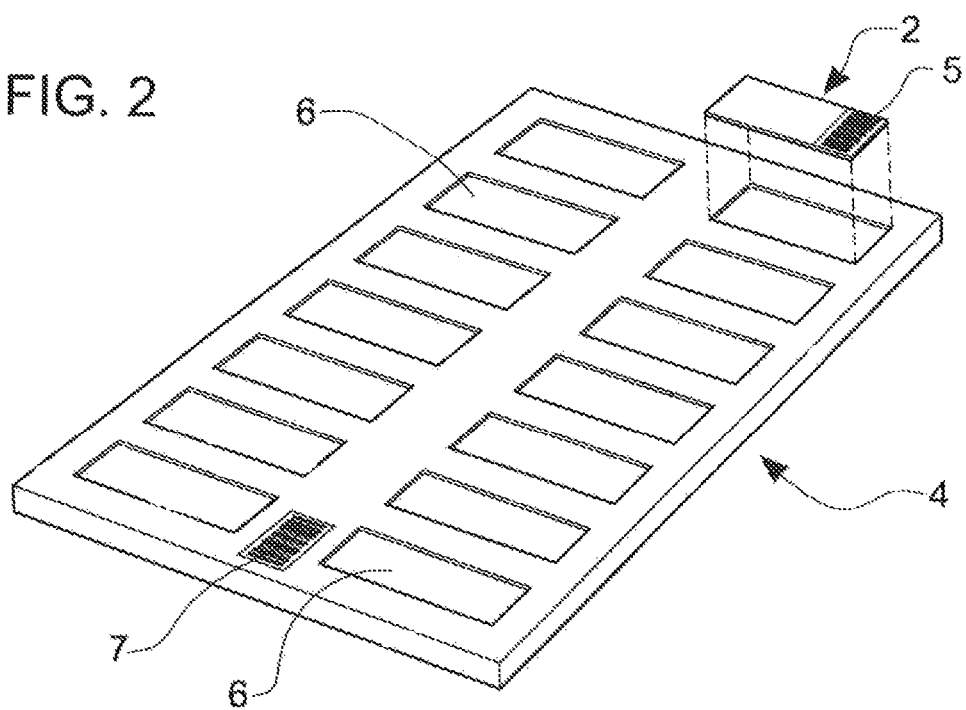

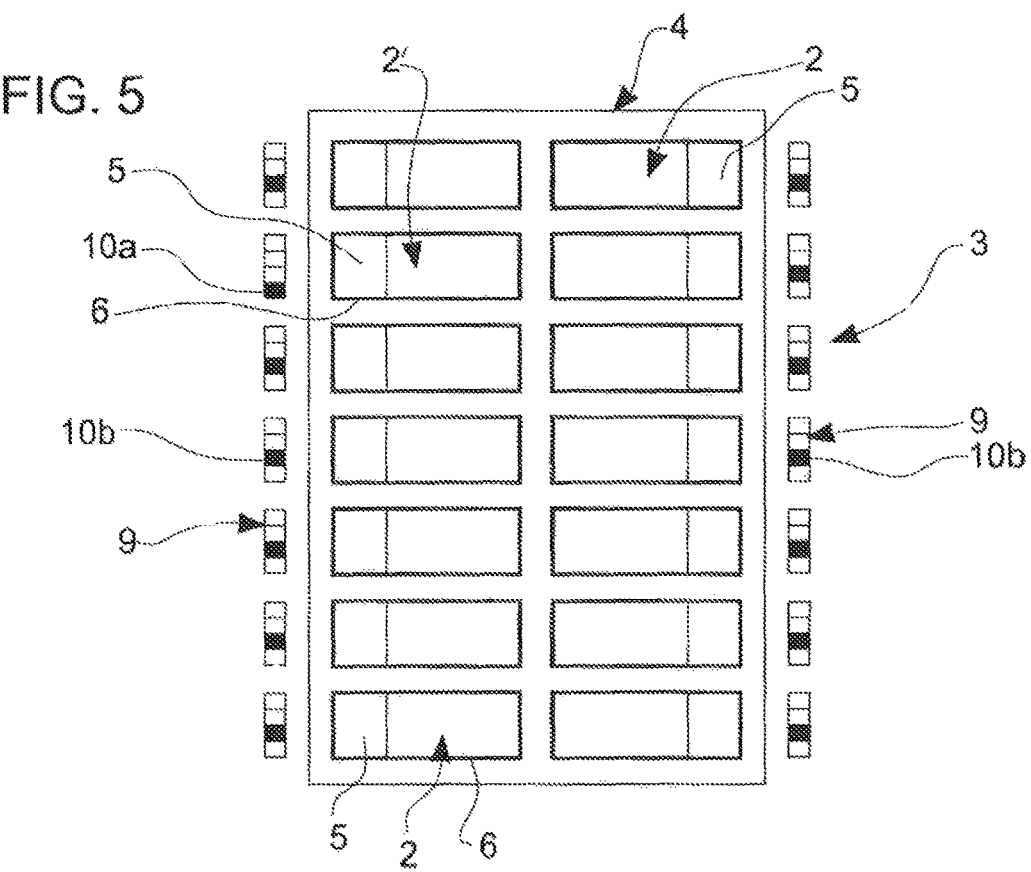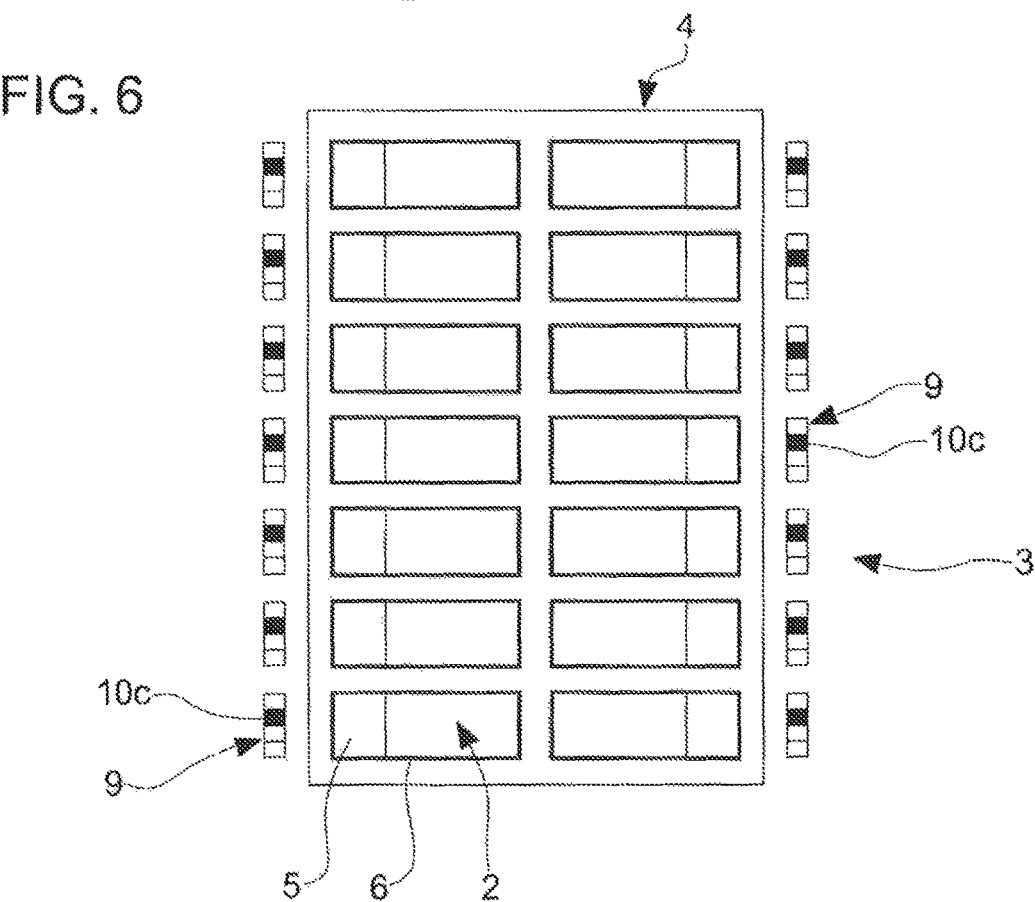

FIG. 7
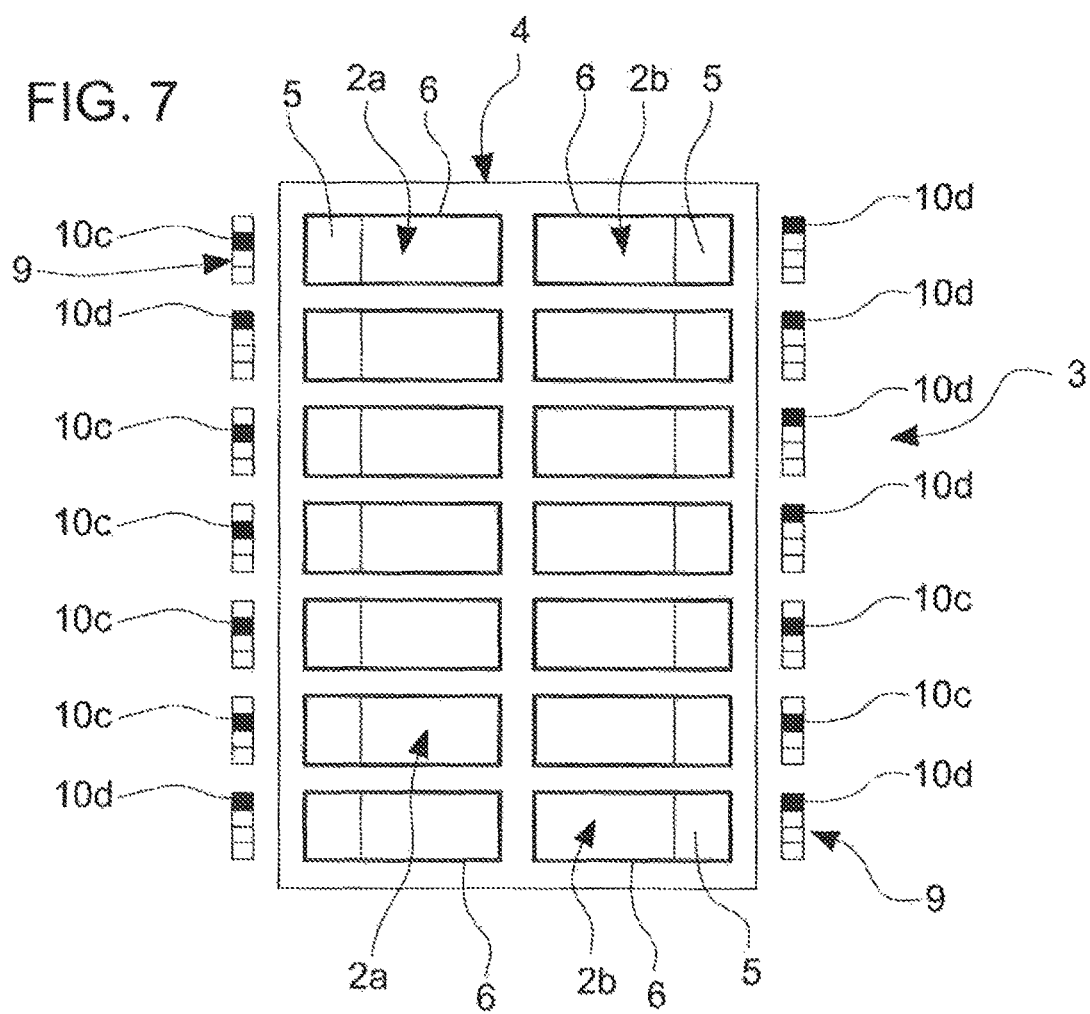
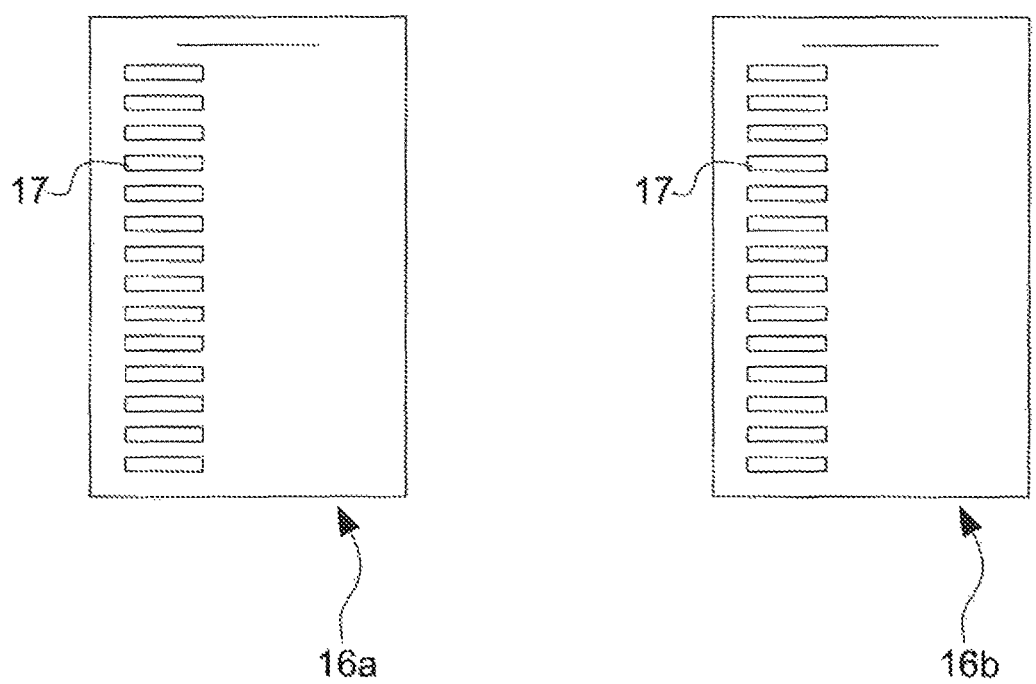

APPARATUS AND METHOD FOR PROVIDING VISUAL SIGNALS RELATING TO A PLURALITY OF LABORATORY SAMPLE CARRIERS

The present invention relates to an apparatus and a method for providing visual signals relating to a plurality of laboratory sample carriers, and particularly to sample carriers in the form of laboratory slides.

In a hospital laboratory, a sample from a patient may be divided and the divided parts placed on separate laboratory slides. Each of these slides may be provided with an identification code and information which relates to the sample part that is on the slide. A patient request form may list the identification codes of the slides that contain the sample parts. Each sample part may be processed in a different way in a different part of the laboratory. In a Histology laboratory, for example, a tissue sample may be sectioned into multiple parts and placed on slides wherein different parts are subjected to different staining processes. The laboratory slides containing the processed divided sample parts are then gathered and placed on a tray in a group which is then passed to a consultant for diagnosis. The tray may hold more than one group of laboratory slides wherein each group relates to a different patient or case, and there is a different request form for each patient. The laboratory slides may need to be arranged in a particular order on the tray for the or each patient or case. This can be very time consuming as an operator would tend to have to move the slides around many times as they load the tray.

Before the tray is passed to the consultant, a technician may need to verify that all the slides listed on the patient request form(s) are present on the tray. Also, slides for other patients may accidentally end up on the tray and the technician would need to check that the tray does not include slides that are not listed on the patient request form(s).

The above process may be done by manually checking each slide against the patient request form but this is prone to human error.

Another way involves the identification code and sample part information of each laboratory slide being in the form of a barcode which is on the slide, and each slide identification code on the patient request form also being in the form of a barcode. Before the tray is passed to the consultant, a technician scans the barcodes on the patient request form and also scans the barcode of each slide present. Software such as Pyramid Innovation's Pi Tracking System can be used to verify that all the slides listed on the patient request form are present on the tray.

Sometimes the laboratory slide barcodes are unreadable and samples from unidentified slides may still be processed wasting time.

After the consultant has finished with the laboratory slides on the tray, the tray with the slides is returned to the laboratory so that the slides can then be placed into storage. However, some of the slides that were on the tray that was initially given to the consultant may not be returned to the tray and/or other slides may be placed on the tray before the tray arrives back at the laboratory. It would be useful to highlight any changes to what was initially on the tray before the slides are placed into storage.

It is an object of the present invention to provide an apparatus and method to alleviate at least one of the above-mentioned problems.

According to one aspect of the present invention there is provided an apparatus for providing visual signals relating to a plurality of laboratory sample carriers, the apparatus comprising:
 a tray for holding a plurality of laboratory sample carriers wherein each sample carrier displays an identification code, the tray having a plurality of carrier bays wherein each carrier bay is arranged to receive one laboratory sample carrier;
 a visual signal emitting device for emitting a visual signal for each carrier bay;
 a digital camera mounted with respect to the tray for taking a digital image of at least part of the tray; and
 a processing device operatively connected to the digital camera and to the visual signal emitting device, the processing device configured to process the digital image and read the laboratory sample carrier identification codes in the image, the processing device being configured to activate the visual signal emitting device to emit at least one said visual signal for each occupied carrier bay included in the image, wherein the visual signal emitted for each said carrier bay is determined by the sample carrier identification code read by the processing device from a corresponding carrier bay part of the processed image.

The processing means may be configured to process the digital image to locate which laboratory sample carriers have been received in which carrier bays in the image.

Before the laboratory sample carriers containing the different sample parts are sent to the different parts of the laboratory for the sample parts to be processed, the sample carriers can be placed on the tray. By virtue of the camera taking a digital image of the tray, a visual signal can be emitted for the carrier bays which have laboratory sample carriers whose carrier identification codes cannot be read. These sample carriers are thus quickly identified, and hence can be removed so that they do not get processed.

Where the tray holds a group of laboratory sample carriers relating to a patient, a visual signal can be emitted for the carrier bays which have laboratory sample carriers belonging to the group. Thus, any laboratory sample carriers on the tray which do not belong to the group can be quickly identified.

The apparatus may include a tray support for holding the tray. The digital camera may be connected to the tray support so that the digital camera is located to be able to take the digital image of a said tray held by the tray support. The tray support may have a sensor for detecting when the tray is placed on the tray support. The digital camera may be configured to be activated after the sensor has detected that the tray has been placed on the tray support. The visual signal emitting device may form part of the tray support.

The visual signal emitting device may comprise at least one light by each carrier bay of the tray. The at least one light may be configured to illuminate at least part of the carrier bay. Thus, the at least one light may be positioned so that it can illuminate a laboratory sample carrier in the carrier bay. This enhances the visual effect of the light. The visual signal emitting device may comprise a plurality of lights by each carrier bay. Each light of the plurality of lights may be arranged to be illuminated in a different colour. Thus, where the tray holds two groups of laboratory sample carriers, there can be a light emitting one colour for the carrier bays which have laboratory sample carriers belonging to one group and another light emitting another colour for the carrier bays which have laboratory sample carriers belonging to the other group. Any laboratory sample carriers on the tray which do not belong to the groups can be quickly identified. Each light may be a light emitting diode (LED).

The visual signal emitting device may comprise at least one light projector for illuminating a region associated with each carrier bay that appeared in the digital image taken by the camera. The at least one light projector may be configured to selectively illuminate each region in different colours. The region may comprise the carrier bay. The at least one light projector may be configured to project an image on the tray wherein different parts of the image are in different colours to illuminate carrier bays in different colours. Thus, where the tray holds two groups of laboratory sample carriers, the carrier bays which have laboratory sample carriers belonging to one group can be illuminated in one colour and the carrier bays which have laboratory sample carriers belonging to the other group can be illuminated in a different colour.

The tray may have an identification code. Thus, laboratory sample carriers can be linked to a given tray.

The apparatus may include a data reading device connected to the processing device for reading data relating to laboratory sample carriers occupying the carrier bays of the tray. The data may be read from a patient request form.

The apparatus may include a display for displaying information relating to a laboratory sample carrier associated with the tray.

According to another aspect of the present invention there is provided a method for providing visual signals relating to a plurality of laboratory sample carriers, the method comprising the steps of:

placing laboratory sample carriers on corresponding carrier bays of a tray wherein each sample carrier displays an identification code;

taking a digital image of at least part of the tray with a digital camera;

processing the digital image with a processing device to read the laboratory sample carrier identification codes in the image; and activating a visual signal emitting device to emit at least one visual signal for each occupied carrier bay included in the image wherein the visual signal emitted for each said carrier bay is determined by the sample carrier identification code read by the processing device from a corresponding carrier bay part of the processed image.

According to yet another aspect of the present invention there is provided a method for monitoring a tray of laboratory sample carriers, the method comprising the steps of:

placing laboratory sample carriers on corresponding carrier bays of a tray wherein each sample carrier has an identification code;

on a first occasion taking a first digital image of at least part of the tray with a digital camera;

processing the first digital image with a processing device to read the laboratory sample carrier identification codes in the first image;

on a second occasion taking a second digital image of the at least part of the tray with the digital camera;

processing the second digital image with the processing device to read the laboratory sample carrier identification codes in the second image; and comparing for each carrier bay that appears in both the first and second images the identification code for the laboratory sample carrier at that carrier bay from the first image with the identification code for the laboratory sample carrier at that carrier bay from the second image, identifying any differences, and providing an output identifying such differences.

Thus, any laboratory sample carriers that have been subsequently placed on tray since the first occasion (e.g. when the tray is given to the consultant) or any laboratory sample carriers which have gone missing from the tray can be quickly identified. Also, it can be quickly identified if the laboratory sample carriers are no longer in the same order on the tray.

According to a further aspect of the present invention there is provided an apparatus for providing visual signals relating to a plurality of laboratory sample carriers, the apparatus comprising: a tray for holding a plurality of laboratory sample carriers wherein each sample carrier displays an identification code, the tray having a plurality of carrier bays wherein each carrier bay is arranged to receive one laboratory sample carrier; a visual signal emitting device for emitting a visual signal for each carrier bay; a data input device for inputting data associated with each identification code; and a processing device operatively connected to the data input device and to the visual signal emitting device, the processing device configured to process the data associated with the laboratory sample carrier identification codes, the processing device being configured to activate the visual signal emitting device to emit a visual signal for a said carrier bay to indicate the carrier bay that is to receive the laboratory sample carrier associated with the data input for the identification code for that laboratory sample carrier.

By the visual signal emitting device being activated to emit a visual signal to indicate the carrier bay that is to receive a particular laboratory sample carrier, this can save an operator much time as they do not have to work out for themselves where the laboratory sample carrier is to be located. This is especially so when there are a large number of laboratory sample carriers to be placed in one or more trays. This also reduces the risk of a laboratory sample carrier being placed in the wrong carrier bay or laboratory sample carriers being placed in the wrong order on a tray.

The apparatus may include a data reading device comprising the data input device wherein each identification code is read by the data reading device.

According to a yet further aspect of the present invention there is provided a method for providing visual signals relating to a plurality of laboratory sample carriers, the method comprising the steps of: (a) providing a tray for holding a plurality of laboratory sample carriers wherein each sample carrier displays an identification code, the tray having a plurality of carrier bays wherein each carrier bay is arranged to receive one laboratory sample carrier; (b) providing a visual signal emitting device for emitting a visual signal for each carrier bay; (c) inputting data associated with each identification code with a data input device; and (d) processing the data associated with the laboratory sample carrier identification codes with a processing device operatively connected to the data input device and to the visual signal emitting device, and activating the visual signal emitting device to emit a visual signal for a said carrier bay to indicate the carrier bay that is to receive the laboratory sample carrier associated with the data input for the identification code for that laboratory sample carrier.

Step (c) may initially comprise inputting data associated with an identification code of one laboratory sample carrier with the data input device. Step (d) may initially comprise activating the visual signal emitting device to emit a visual signal for a said carrier bay to indicate the carrier bay that is to receive the laboratory sample carrier associated with the inputted data. This enables an operator to place the laboratory sample carrier in the correct location as indicated by the activated visual signal emitting device. Steps (c) and (d) may be repeated until the data associated with the identification codes of all the laboratory sample carriers have been entered. Thus, the process is repeated until all the laboratory samples carriers are placed in the tray.

Any of the optional features described above associated with any aspect of the present invention described above could be combined with any of the other aspects of the present invention described above.

Embodiments of the present invention will now be described, by way of example, with reference to the accompanying schematic drawings, in which:

FIG. 1 is a perspective view of an apparatus in accordance with a first embodiment of the invention;

FIG. 2 is a perspective view of a tray of the apparatus and a laboratory slide to be held by the tray;

FIGS. 5 and 6 are plan views of a part of the apparatus showing arrays of LEDs and showing the tray holding laboratory slides;

FIG. 7 is a plan view similar to FIGS. 5 and 6 and also showing associated patient request forms;

Figure 3:
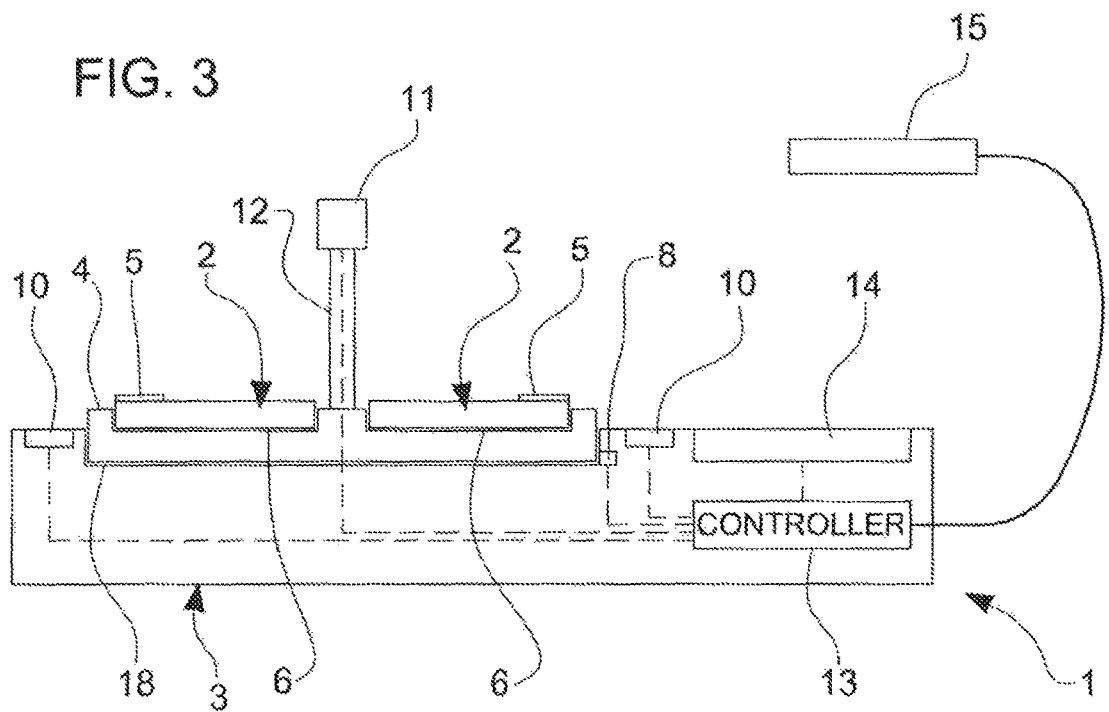
FIG. 3 is a cross-sectional view of the apparatus.

Referring to FIGS. 1 to 3 of the accompanying drawings, an apparatus 1 for providing visual signals relating to a plurality of laboratory sample carriers 2 according to a first embodiment of the invention, comprises a tray support 3 which holds a tray 4.

The tray 4 is arranged to hold a plurality of laboratory sample carriers in the form of laboratory slides 2 wherein each laboratory slide 2 displays an identification code in the form of a barcode 5. The tray 4 has two rows of up to ten slide bays 6. In the tray 4 illustrated there are only seven slide bays 6 in each row. Each slide bay 6 is arranged to receive one laboratory slide 2 and has a depth which is less than the thickness of the slide 2. The tray 4 also has an identification code in the form of a barcode 7.

The tray support 3 has a sensor, such as an optical sensor 8, for detecting when the tray 4 has been placed correctly in a tray receiving recess 18 of the tray support 3. The tray support 3 also has a linear series of arrays 9 of LEDs 10 by each row of slide bays 6 of the tray 4 when the tray 4 has been placed correctly in the tray receiving recess 18. Each array 9 corresponds to a respective slide bay 6 and each LED 10 of the array 9 is arranged to be illuminated in a different colour. There is a gap between adjacent arrays 9 in each linear series. However, adjacent arrays 9 may be arranged to abut each other so that the linear series of arrays forms one continuous line of LEDs 10.

A digital camera 11 is mounted on a camera mount 12 that extends from the tray support 3. The digital camera 11 is located on the mount 12 so as to be able to take a digital image of the tray 4 held by the tray support 3.

The tray support 3 contains a processing device or controller 13 which is operatively connected to the digital camera 11 and to the arrays 9 of LEDs 10. The tray support 3 has a display and input device 14 operatively connected to the processing device 13 wherein the display and input device comprises a touch screen 14. A barcode scanner 15 is operatively connected to the processing device 13 for reading the barcodes 5 on the laboratory slides 2 and the barcode 7 on the tray 4.

In use, laboratory slides 2 relating to a patient are placed on corresponding slide bays 6 of the tray 4.

Figure 4:
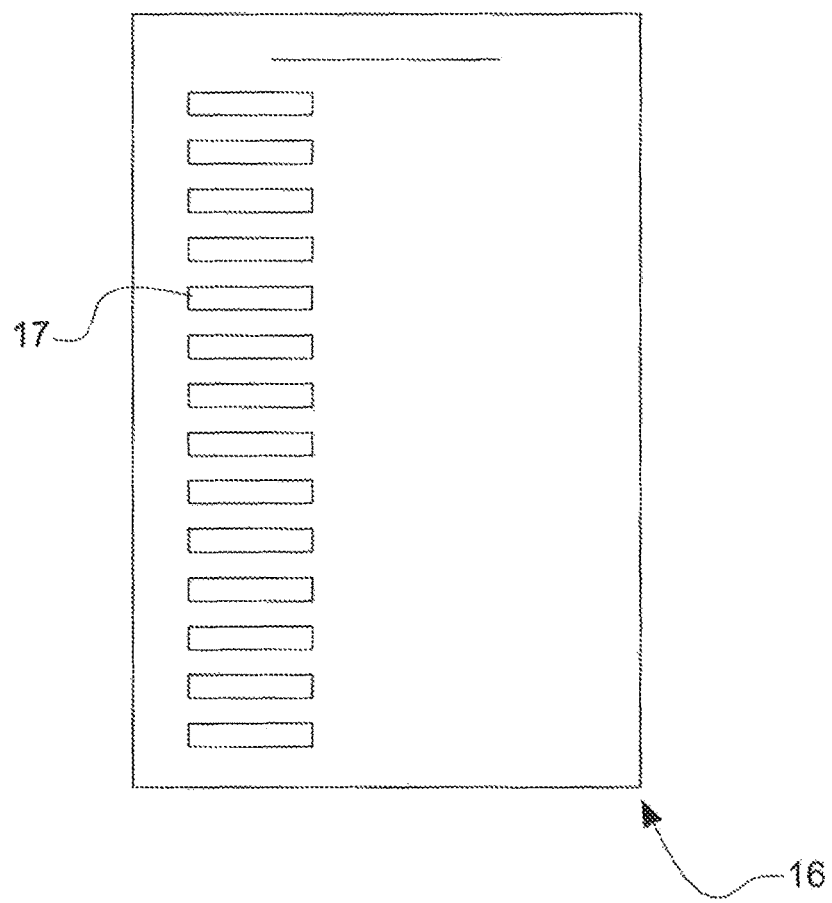
FIG. 4 is a view of a patient request form associated with laboratory slides held by the tray.

A patient request form 16 (see FIG. 4) contains slide identification codes 17 for the slides 2 associated with a patient wherein those slides 2 should be on the tray 4. The slide identification codes are in the form of barcodes 17 which are scanned with the barcode scanner 15.

The tray 4 is placed on the tray support 3. When the sensor 8 has detected that the tray 4 has been placed on the tray support 3, it sends a signal to the processing device 13 which then activates the digital camera 11. A digital image of the tray 4 is taken with the digital camera 11. The processing device 13 uses software to process the digital image to read the laboratory slide barcodes 5 in the image, and locates which laboratory slides 2 are in which slide bays 6 in the image. Thus, the location of the laboratory slides 2 is derived by mapping the location of the barcodes 5.

Referring to FIG. 5, if the barcode 5 cannot be read for the image of any laboratory slide 2' in the digital image, then the processing device 13 activates a first LED 10a in the array 9 corresponding to the slide bay 6 having this slide 2'. The first LED 10a may emit a red light to indicate this. The unreadable laboratory slide 2' can then be removed from the tray 4.

Where the barcodes 5 are read for the images of the laboratory slides 2 in the digital image, the processing device 13 activates a second LED 10b in the arrays 9 corresponding to the slide bays 6 having these slides 2. The second LED 10b may emit a green light to indicate this.

Referring to FIG. 6, for all the laboratory slides 2 on the tray 4 whose barcodes 5 provide identification codes that match slide identification codes 17 scanned from the patient request form 16, the processing device 13 activates a third LED 10c in the arrays 9 corresponding to the slide bays 6 having these slides 2. The LED 10c activated may emit, say, a blue light to indicate this. Thus, it is immediately clear which laboratory slides 2 on the tray 4 are also identified on the patient request form 16. If any laboratory slide 2 identified on the patient request form 16 is not identified as being on the tray 4 then a message to this effect can appear on the touch screen 14. If there are any laboratory slides 2 on the tray 4 whose barcodes 5 do not provide identification codes which match slide identification codes 17 scanned from the patient request form 16 then these can be readily identified by not illuminating the third LED 10c corresponding to the slide bays 6 having these slides. Alternatively, there may be another LED in the array 9 to indicate this.

In some cases, the tray 4 may hold a plurality of laboratory slides 2 wherein different groups of the slides are associated with different patients and there is a separate patient request form for each patient.

FIG. 7 illustrates a tray 4 holding first and second groups of laboratory slides 2a, 2b wherein each group of slides is associated with a respective patient. Slide identification barcodes 17 on a patient request form 16a for the first patient and slide identification barcodes 17 on a patient request form 16b for the second patient are scanned with the barcode scanner 15. When the tray 4 is in the tray receiving recess 18 of the tray support 3, a digital image of the tray 2 is taken with the digital camera 11. For all laboratory slides 2a on the tray 4 whose barcodes 5 provide identification codes that match slide identification barcodes 17 scanned from the first patient request form 16a, the processing device 13 activates a third LED 10c in the arrays 9 corresponding to the slide bays 6 having these slides 2a. The third LED 10c emits light in one colour. For all laboratory slides 2b on the tray 4 whose barcodes 5 provide identification codes that match slide identification barcodes 17 scanned from the second patient request form 16b, the processing device 13 activates a fourth LED 10d in the arrays 9 corresponding to the slide bays 6 having these slides 2b. The fourth LED 10d emits light in a different colour. Thus, it is immediately clear which laboratory slides 2a, 2b on the tray 4 are associated with which patient.

Although not shown in FIG. 7, for all the laboratory slides 2 whose barcodes 5 are read, the second LED 10b in the corresponding arrays 9 could be activated and for any the laboratory slide 2' whose barcode 5 could not be read, the first LED 10a could be activated.

Figure 8:
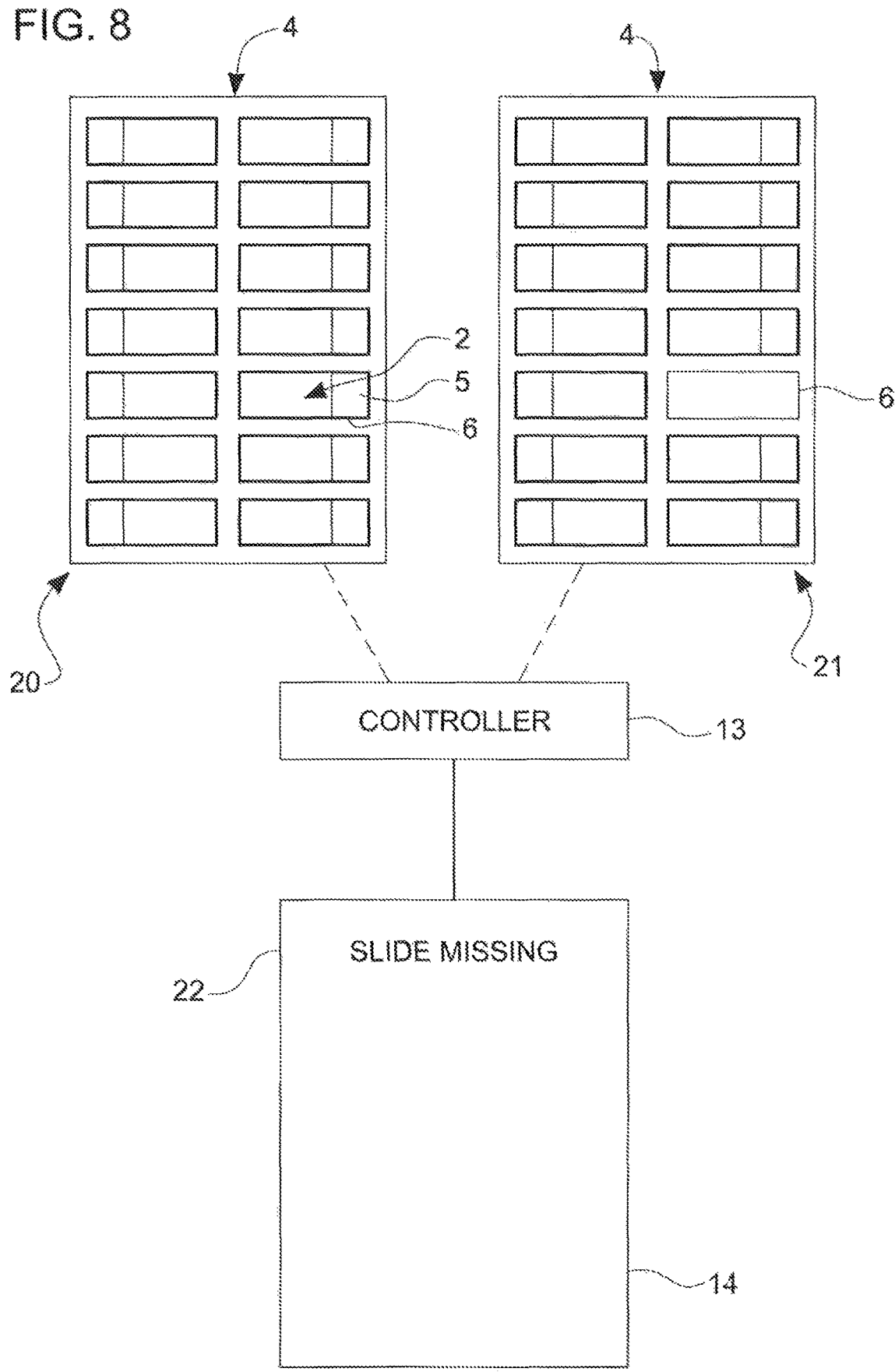
FIG. 8 is a diagram showing the monitoring of a tray of laboratory slides.

Referring particularly to FIG. 8, the apparatus 1 may also be used to monitor the tray 4 of laboratory slides 2.

A first digital image 20 of the tray 4 is taken with the digital camera 11 on a first occasion. The first digital image 20 is processed with the processing device 13 to read the laboratory slide barcodes 5 in the first digital image 20.

A second digital image 21 of the tray 4 is taken with the digital camera 11 on a second occasion. The second digital image 21 is processed with the processing device 13 to read the laboratory slide barcodes 5 in the second digital image 21.

For each laboratory slide bay 6 in the tray 4 that appears in both the first and second digital images 20, 21, the processing device 13 uses software to compare the barcode 5 for the laboratory slide 2 at that slide bay 6 from the first digital image 20 with the barcode for the laboratory slide at that slide bay 6 from the second digital image 21. Any differences, such as an image of the slide not appearing in second digital image 21, are identified by the software, and the processing device 13 provides a message 22 which is displayed on the touch screen 14 identifying such differences.

The apparatus 1 may be used to help load the tray 4 with laboratory slides 2 in a required order on the tray 4. The barcode 5 of one laboratory slide 2 is scanned with the barcode scanner 15. The processing device 13 then activates and one or more LEDs 10 of the array 9 by the slide bay 6 that is to receive the laboratory slide 2 whose barcode 5 has just been scanned. The operator can then place the laboratory slide 2 in the indicated slide bay 6. The barcode scanner 15 is then used to scan the barcode 5 of another laboratory slide 2 and the process is repeated until the tray 4 has received all the required laboratory slides 2 wherein all the slides 2 are in the required order.

Figure 9:
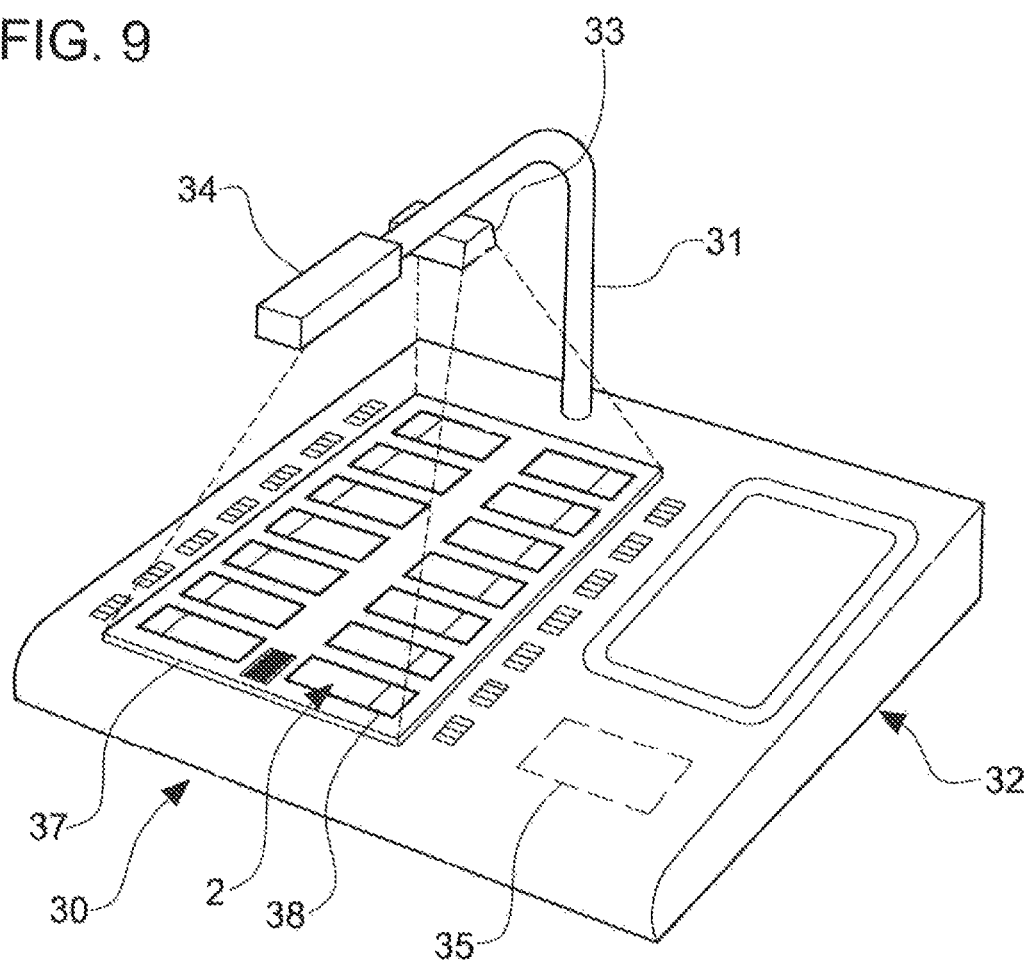
FIG. 9 is a perspective view of an apparatus in accordance with a second embodiment of the invention.

A modified apparatus 30 for providing visual signals relating to a plurality of laboratory slides 2 according to a second embodiment of the invention is illustrated in FIG. 9. The camera mount 31 that extends from the tray support 32 has a light projector 33 attached to it adjacent the digital camera 34. The light projector 33 is operatively connected to the processing device 35.

In use, instead of the processing device activating LEDs associated with carrier bays of the tray 37, the processing device 35 activates the light projector 33 to illuminate each carrier bay 38 covered by the digital image taken by the camera 34. The light projector 33 projects an image on the tray 37 wherein different parts of the projected image can be in different colours so that different carrier bays 38 can be illuminated in different colours.

Figure 10:
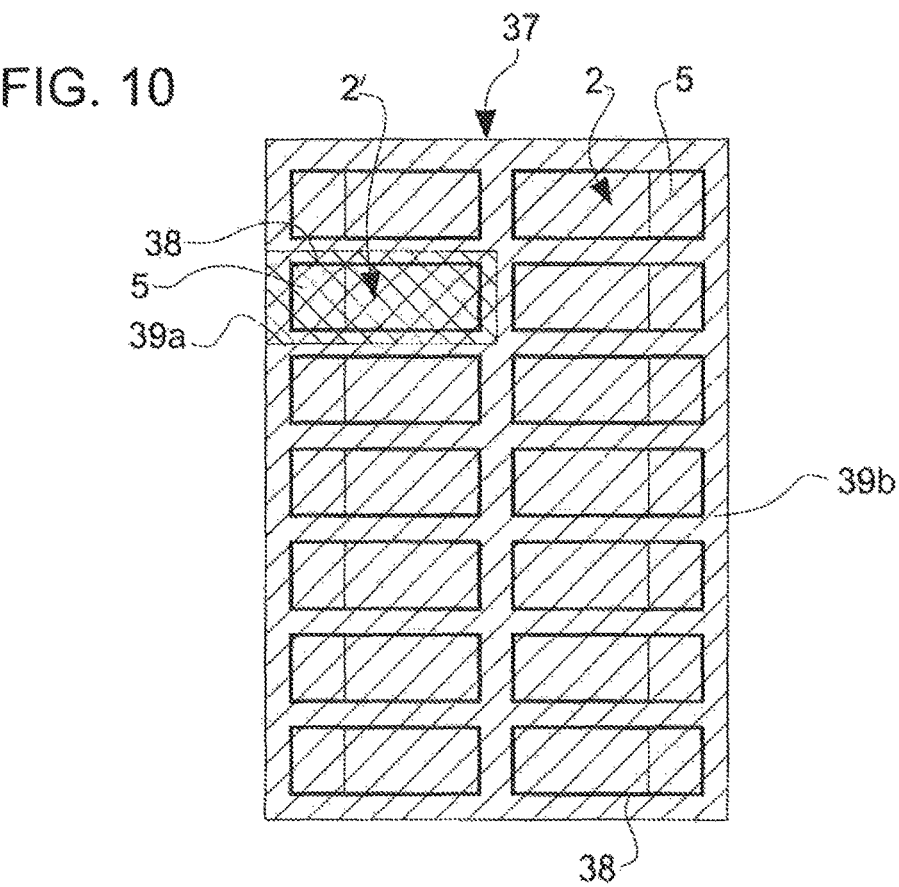
FIGS. 10 and 11 are plan views of the tray holding laboratory slides with images projected on the tray by the apparatus of FIG. 9.

Referring to FIG. 10, if a barcode 5 cannot be read for the image of any laboratory slide 2' in the digital image, then the processing device 35 causes the light projector 33 to illuminate the corresponding carrier bay 38 in one colour 39a (e.g. red). For all the laboratory slides 2 whose barcodes 5 are read, the processing device 35 causes the light projector 33 to illuminate the corresponding carrier bays 38 in another colour 39b (e.g. green).

Figure 11:
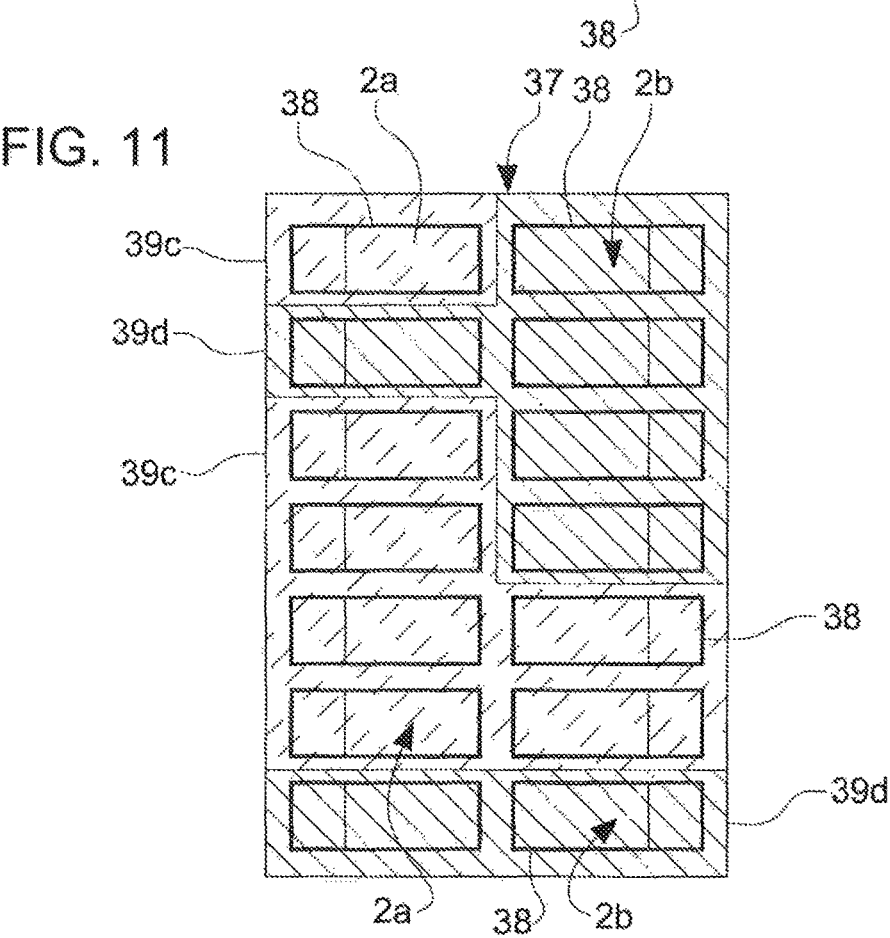

Referring to FIG. 11, where the tray 37 holds first and second groups of laboratory slides 2a, 2b wherein each group of slides is associated with a respective patient, for all the laboratory slides 2a in the image associated with the first patient, the processing device 35 causes the light projector 33 to illuminate the corresponding carrier bays 38 in one colour 39c and for all the laboratory slides 2b in the image associated with the second patient, the processing device 35 causes the light projector 33 to illuminate the corresponding carrier bays 38 in another colour 39d.

In a modification, the light projector may illuminate a region associated with each carrier bay wherein the illuminated region may be separate from the carrier bay. Thus, the light projector may illuminate a region adjacent the carrier bay. The illuminated region may include at least part of the carrier bay.

Whilst particular embodiments have been described, it will be understood that various modifications may be made without departing from the scope of the claimed invention. The laboratory slide tray may have different arrangements of slide bays from that described.

Although the above embodiments have been described with reference to laboratory slides, they could be easily adapted for other forms of laboratory sample carriers such as cassettes.

The invention claimed is:

1. An apparatus for providing visual signals relating to a plurality of laboratory sample carriers, the apparatus comprising:

a tray for holding a plurality of laboratory sample carriers wherein each sample carrier displays an identification code, the tray having a plurality of carrier bays wherein each carrier bay is arranged to receive one laboratory sample carrier;

a tray support for holding the tray;

a digital camera mounted with respect to the tray for taking a digital image of at least part of the tray, wherein the digital camera is connected to the tray support by a camera mount so that the digital camera is located to be able to take the digital image of said tray held by the tray support;

a visual signal emitting device comprising at least one light projector for illuminating a region associated with each carrier bay and selectively illuminating each region in different colours, the at least one light projector being attached to the camera mount adjacent the digital camera; and a processing device operatively connected to the digital camera and to the at least one light projector, the processing device configured to process the digital image and read the laboratory sample carrier identification codes in the image, the processing device being configured to activate at least one light projector to illuminate a region of the tray associated with each occupied carrier bay that appeared in the image, wherein the colour that each said region is illuminated by the at least one light projector is determined by the sample carrier identification code read by the processing device from a corresponding carrier bay part of the processed image.

2. The apparatus as claimed in claim 1, wherein the tray support has a sensor for detecting when the tray is placed on the tray support.

3. The apparatus as claimed in claim 2, wherein the digital camera is configured to be activated after the sensor has detected that the tray has been placed on the tray support.

4. The apparatus as claimed in claim 1, wherein the region comprises the carrier bay.

5. The apparatus as claimed in claim 4, wherein the at least one light projector is configured to project an image on the tray wherein different parts of the image are in different colours to illuminate carrier bays in different colours.

6. The apparatus as claimed in claim 1, wherein the tray has an identification code.

7. A method for providing visual signals relating to a plurality of laboratory sample carriers, the method comprising the steps of:

placing laboratory sample carriers in corresponding carrier bays of a tray wherein each sample carrier displays an identification code;

taking a digital image of at least part of the tray with a digital camera connected by a carrier mount to a tray support for holding the tray;

processing the digital image with a processing device to read the laboratory sample carrier identification codes in the image; and activating a visual signal emitting device comprising at least one light projector attached to the camera mount adjacent the digital camera to illuminate a region of the tray associated with each occupied carrier bay that appeared in the image in a selected one of different colours wherein the colour that each region is illuminated by the at least one light projector is determined by the sample carrier identification code read by the processing device from a corresponding carrier bay part of the processed image.

\* \* \* \* \*